(12) United States Patent
Hsu

(10) Patent No.: US 7,478,788 B2
(45) Date of Patent: Jan. 20, 2009

(54) DISPLAY DEVICE HAVING AN ADJUSTABLE SUPPORTING UNIT

(75) Inventor: Ching-Chang Hsu, Banciao (TW)

(73) Assignee: Hannspree, Inc., Taipei (TW)

( * ) Notice: Subject to any disclaimer, the term of this patent is extended or adjusted under 35 U.S.C. 154(b) by 463 days.

(21) Appl. No.: 11/262,947

(22) Filed: Nov. 1, 2005

(65) Prior Publication Data

US 2007/0012828 A1      Jan. 18, 2007

(30) Foreign Application Priority Data

Jul. 14, 2005   (TW) .............................. 94211960 U

(51) Int. Cl.
  *A47G 29/00*   (2006.01)
(52) U.S. Cl. .................. 248/371; 248/922; 361/681
(58) Field of Classification Search ......... 248/917–919, 248/921–923, 282.1, 278.1, 276.1, 285.1, 248/284.1, 371, 455–457; 269/901; 108/6, 108/9, 118, 121, 122
   See application file for complete search history.

(56) References Cited

U.S. PATENT DOCUMENTS 5,509,360 A * 4/1996 Chiu .......................... 108/119
5,613,662 A * 3/1997 Blackmore .................. 248/371
5,893,604 A * 4/1999 Yao ............................ 297/16.1
6,401,630 B1 * 6/2002 Peterson ...................... 108/12
7,059,254 B2 * 6/2006 Strong et al. ................ 108/118
D553,135 S * 10/2007 Muday et al. ............... D14/452
2001/0050328 A1 * 12/2001 Hu ............................. 248/371
2003/0121124 A1 * 7/2003 Chen .......................... 16/339
2005/0205745 A1 * 9/2005 Lee ............................ 248/371

* cited by examiner

Primary Examiner—Korie Chan
Assistant Examiner—Steven M. Marsh
(74) Attorney, Agent, or Firm—Steptoe & Johnson LLP

(57) ABSTRACT

A display device includes a supporting unit having a coupling seat mounted fixedly on a rear surface of a display unit, two first supporting rods connected pivotally and respectively to opposite lateral sides of the seat, and two second supporting rods connected pivotally and respectively to the first supporting rods. A positioning unit includes two positioning necks each provided on top of a respective second supporting rod, and two rows of positioning holes formed in the rear surface of the display unit and disposed respectively adjacent to the lateral sides of the seat. Each neck corresponds to a respective row of the positioning holes, and engages a selected positioning hole in the respective row such that the display unit is positioned at a desired angle of inclination.

7 Claims, 3 Drawing Sheets

DISPLAY DEVICE HAVING AN ADJUSTABLE SUPPORTING UNIT

CLAIM OF PRIORITY

This application claims priority under 35 USC 119 to Taiwanese Patent Application No. 094211960, filed on Jul. 14, 2005, the entire contents of which is hereby incorporated by reference.

CROSS-REFERENCE TO RELATED APPLICATION

This application claims priority of Taiwanese Application No. 094211960, filed on Jul. 14, 2005.

BACKGROUND OF THE INVENTION

1. Field of the Invention

The invention relates to a display device, more particularly to a display device having an adjustable supporting unit.

2. Description of the Related Art

Referring to FIG. 1, a conventional display device 9 is shown to include a display panel 91, and a supporting frame 92 that has a base portion 921, and a supporting arm portion 922 connected pivotally to each of the display panel 91 and the base portion 921 for supporting the display panel 91 at a desired angle of inclination.

However, in such a configuration, when the size of the display panel 91 become larger, the structure of the supporting frame 92 becomes more complicated, thereby increasing fabrication costs. Furthermore, the supporting frame 92 cannot support the display panel 91 at a position tilted to a considerably large extent.

SUMMARY OF THE INVENTION

Therefore, the object of the present invention is to provide a display device having an adjustable supporting unit capable of positioning a display unit at a considerably large angle of inclination.

According to the present invention, a display device comprises:

a display unit having a rear surface;

a supporting unit including a coupling seat mounted fixedly on the rear surface of the display unit and having opposite lateral sides, a pair of first supporting rods connected pivotally and respectively to the lateral sides of the coupling seat such that the coupling seat is rotatable relative to the first supporting rods, and a pair of second supporting rods connected pivotally and respectively to the first supporting rods such that each of the second supporting rods is rotatable relative to the respective one of the first supporting rods; and a positioning unit including two positioning necks, each of which is provided on top of a respective one of the second supporting rods, and two rows of spaced-apart positioning holes formed in the rear surface of the display unit and disposed respectively adjacent to the lateral sides of the coupling seat, each of the positioning necks corresponding to a respective one of the rows of the positioning holes and engaging a selected one of the positioning holes in the respective one of the rows such that the display unit is positioned at a desired angle of inclination.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
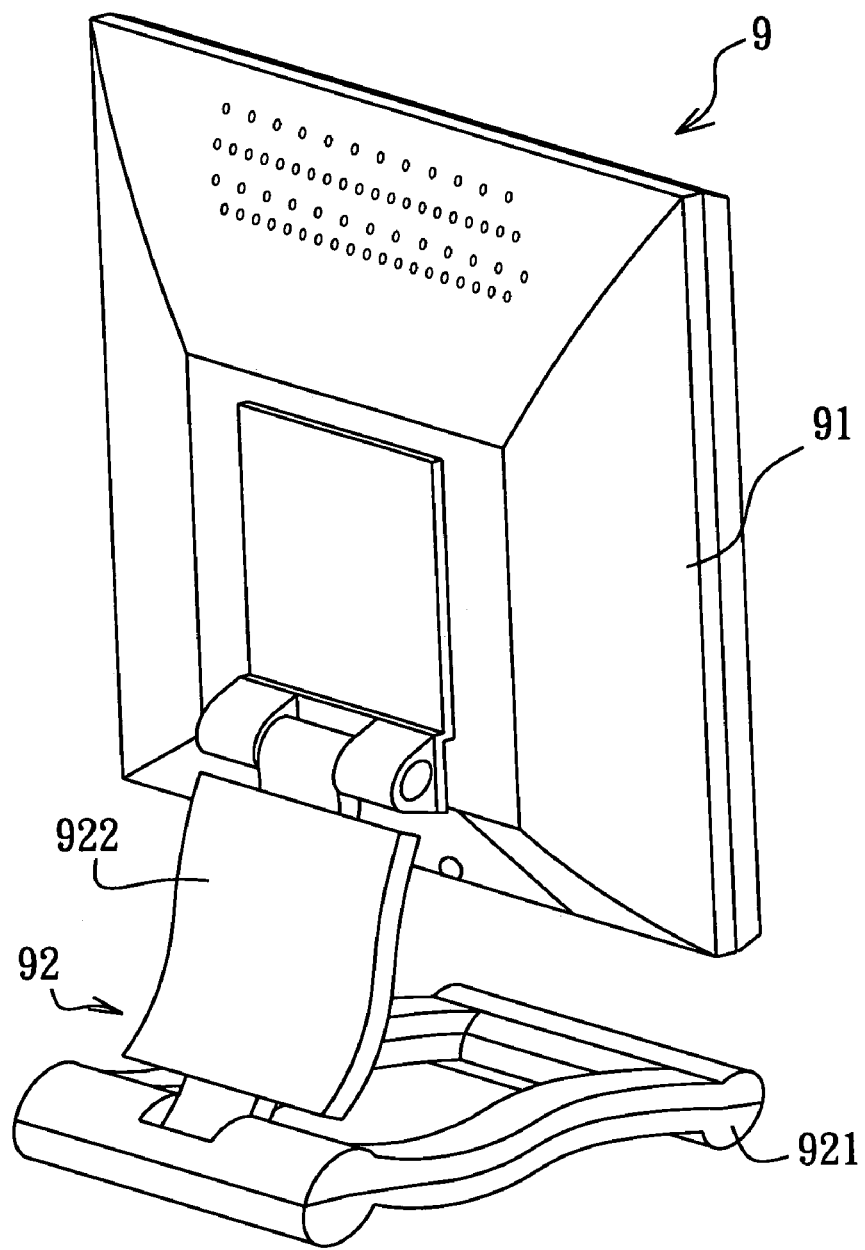
FIG. 1 is a perspective view of a conventional display device.
Figure 2:
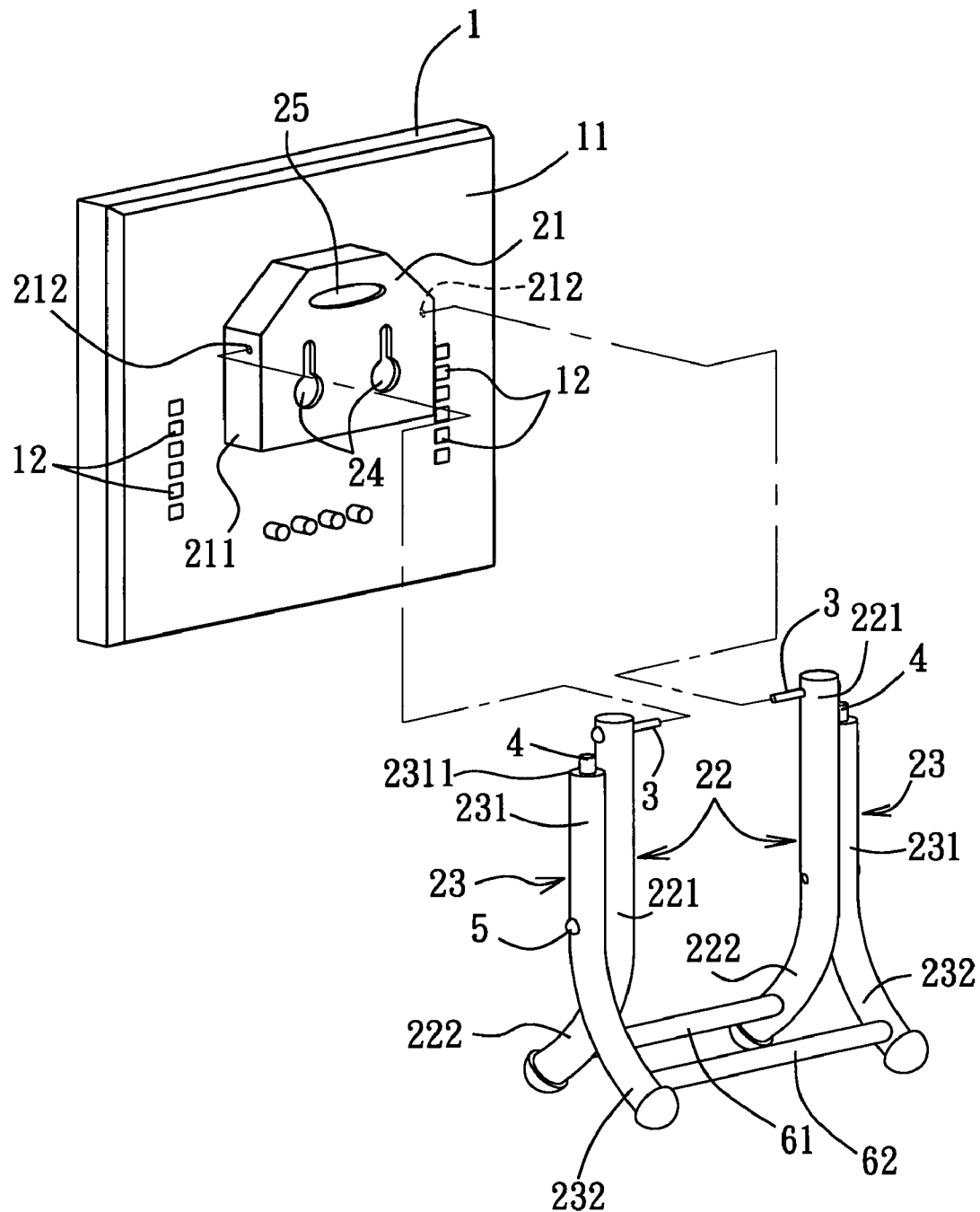
FIG. 2 is a partly exploded perspective view showing the preferred embodiment of a display device according to the present invention.
Figure 3:
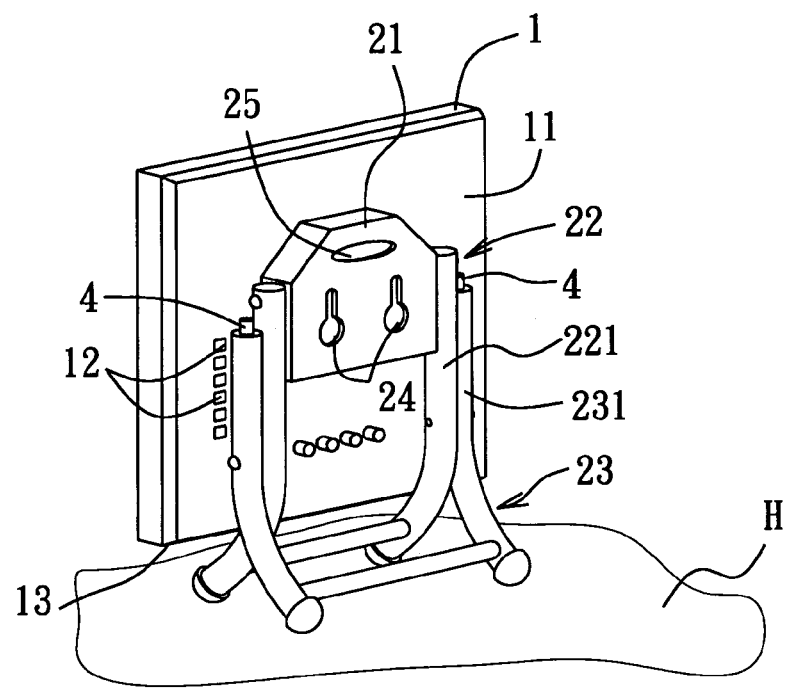
FIG. 3 is a perspective view showing the preferred embodiment when a supporting unit is in a retracted state.

Referring to FIGS. 2 and 3, the preferred embodiment of a display device according to the present invention is shown to include a display unit 1 having a rear surface 11, a supporting unit, and a positioning unit.

The supporting unit includes a coupling seat 21, a pair of first supporting rods 22, and a pair of second supporting rods 23.

The coupling seat 21 is mounted fixedly on the rear surface 11 of the display unit 1, and has opposite lateral sides 211, each of which is formed with a pivot hole 212. In this embodiment, the coupling seat 21 is further formed with two hanger holes 24 and an oval grip hole 25, which permits insertion of fingers.

The first supporting rods 22 are connected pivotally and respectively to the lateral sides 211 of the coupling seat 21 such that the coupling seat 21 is rotatable relative to the first supporting rods 22. In this embodiment, each first supporting rod 22 has a straight first coupling section 221 with a pivot pin 3 that is disposed detachably thereon and that engages pivotally the pivot hole 212 in the respective one of the lateral sides 211 of the coupling seat 21, and a curved first supporting section 222 having an upper end connected to a lower end of the first coupling section 221.

The second supporting rods 23 are connected pivotally and respectively to the first supporting rods 22 such that each of the second supporting rods 23 is rotatable relative to the respective one of the first supporting rods 22. In this embodiment, each second supporting rod 23 has a straight second coupling section 231 connected pivotally to the first coupling section 221 of the respective one of the first supporting rods 22 by means of a pivot pin 5, and a curved second supporting section 232 having an upper end connected to a lower end of the second coupling section 231. The second supporting section 232 of each of the second supporting rods 23 and the first supporting section 222 of the respective one of the first supporting rods 22 extend downwardly and outwardly away from each other.

Figure 4:
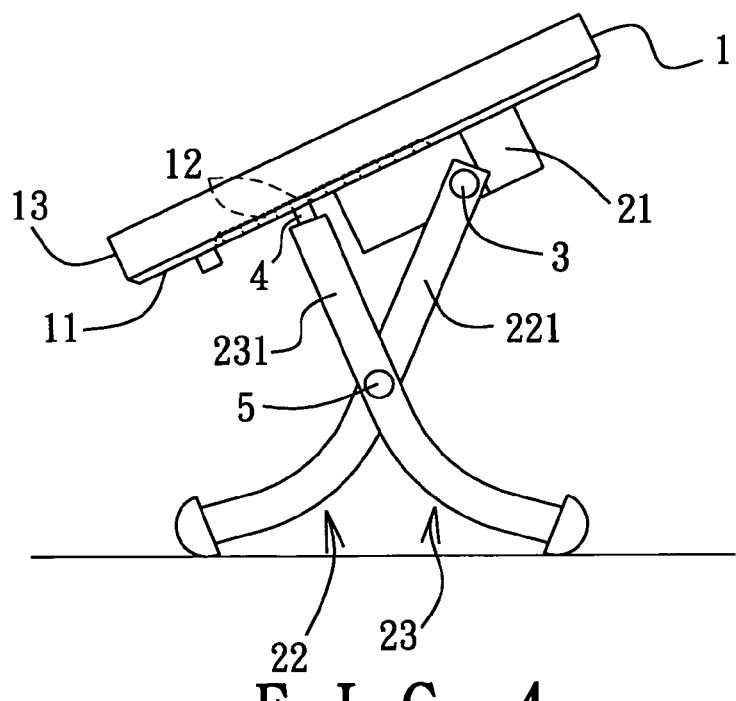
FIG. 4 is a schematic side view showing the preferred embodiment when the supporting unit is in an expanded state.

The supporting unit is operable between a retracted state, where the first coupling section 221 of each of the first supporting rods 22 is aligned with the second coupling section 231 of the respective one of the second supporting rods 23, as shown in FIG. 3, and an expanded state, where an angle is formed between the first coupling section 221 of each of the first supporting rods 22 and the second coupling section 231 of the respective one of the second supporting rods 23, as shown in FIG. 4. In this embodiment, the supporting unit further includes a first auxiliary rod 61 interconnecting fixedly the first supporting rods 22, and a second auxiliary rod 62 interconnecting fixedly the second supporting rods 23.

The positioning unit includes two positioning necks 4, each of which is provided on a top end 2311 of the second coupling section 231 of a respective one of the second supporting rods 23, and two rows of spaced-apart positioning holes 12 formed in the rear surface 11 of the display unit 1 and disposed respectively adjacent to the lateral sides 211 of the coupling seat 21. Each of the positioning necks 4 corresponds to a respective one of the rows of the positioning holes 12, and engages a selected one of the positioning holes 12 in the respective one of the rows such that the display unit 1 is positioned at a desired angle of inclination.

In actual use, the display unit 1 can be separated from the supporting unit, and can be hung directly on a wall surface (not shown) by means of the hanger holes 24 in the coupling seat 21. When the supporting unit is operated in the retracted state, the display unit 1 can be supported by the supporting unit, and is disposed in a plane perpendicular to a horizontal surface (H) on which the supporting unit is placed, as shown in FIG. 3. When the supporting unit is operated in the expanded state, the display unit 1 can be positioned at the desired angle of inclination by the positioning unit, as shown in FIG. 4.

It is noted that, due to the presence of the supporting unit and the positioning unit, the display unit 1 with a large size can be easily positioned at a considerably large angle of inclination.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A display unit comprising:
  a display unit having a rear surface;
  a supporting unit including
    a coupling seat mounted fixedly on said rear surface of said display unit and having opposite lateral sides,
    a pair of first supporting rods connected pivotally and respectively to said lateral sides of said coupling seat such that said coupling seat is rotatable relative to said first supporting rods, and
    a pair of second supporting rods connected pivotally and respectively to said first supporting rods such that each of said second supporting rods is rotatable relative to the respective one of said first supporting rods; and
  a positioning unit including two positioning necks, each of which is provided on top of a respective one of said second supporting rods, and two rows of spaced-apart positioning holes formed in said rear surface of said display unit and disposed respectively adjacent to said lateral sides of said coupling seat, each of said positioning necks corresponding to a respective one of the rows of said positioning holes and engaging a selected one of said positioning holes in the respective one of the rows such that said display unit is positioned at a desired angle of inclination;
  wherein each of said first supporting rods has a straight first coupling section connected pivotally to the respective one of said lateral sides of said coupling seat, and a curved first supporting section having an upper end connected to said first coupling section;
  wherein each of said second supporting rods has a straight second coupling section connected pivotally to said first coupling section of the respective one of said first supporting rods and having the respective one of said positioning necks provided thereon, and a curved second supporting section having an upper end connected to said second coupling section, said second supporting section of each of said second supporting rods and said first supporting section of the respective one of said first supporting rods extending downwardly and outwardly away from each other; and
  wherein said supporting unit is operable between a retracted state, where said first coupling section of each of said first supporting rods is aligned with said second coupling section of the respective one of said second supporting rods, and an expanded state, where an angle is formed between said first coupling section of each of said first supporting rods and said second coupling section of the respective one of said second supporting rods.

2. The display device as claimed in claim 1, wherein said coupling seat is formed with a plurality of hanging holes.

3. The display device as claimed in claim 1, wherein each of said lateral sides of said coupling seat is formed with a pivot hole, each of said first supporting rods having a pivot pin that is disposed detachable thereon and that engages pivotally said pivot hole in the respective one of said lateral sides of said coupling seat.

4. The display device as claimed in claim 1, wherein said supporting unit further includes a first auxiliary rod interconnecting fixedly said first supporting rods, and a second auxiliary rod interconnecting fixedly said second supporting rods.

5. A display unit comprising:
  a display unit having a rear surface;
  a supporting unit including
    a coupling seat mounted fixedly on said rear surface of said display unit and having opposite lateral sides,
    a pair of first supporting rods connected pivotally and respectively to said lateral sides of said coupling seat such that said coupling seat is rotatable relative to said first supporting rods, and
    a pair of second supporting rods connected pivotally and respectively to said first supporting rods such that each of said second supporting rods is rotatable relative to the respective one of said first supporting rods; and
  a positioning unit including two positioning necks, each of which is provided on top of a respective one of said second supporting rods, and two rows of spaced-apart positioning holes formed in said rear surface of said display unit and disposed respectively adjacent to said lateral sides of said coupling seat, each of said positioning necks corresponding to a respective one of the rows of said positioning holes and engaging a selected one of said positioning holes in the respective one of the rows such that said display unit is positioned at a desired angle of inclination;
  wherein each of said lateral sides of said coupling seat is formed with a pivot hole, each of said first supporting rods having a pivot pin that is disposed detachably thereon and that engages pivotally said pivot hole in the respective one of said lateral sides of said coupling seat.

6. The display device as claimed in claim 5, wherein said coupling seat is formed with a plurality of hanging holes.

7. The display device as claimed in claim 5, wherein said supporting unit further includes a first auxiliary rod interconnecting fixedly said first supporting rods, and a second auxiliary rod interconnecting fixedly said second supporting rods.

* * * * *